Sept 17, 1957     J. E. McCUTCHEN ET AL     2,806,468
TANK HEATER
Filed April 25, 1952
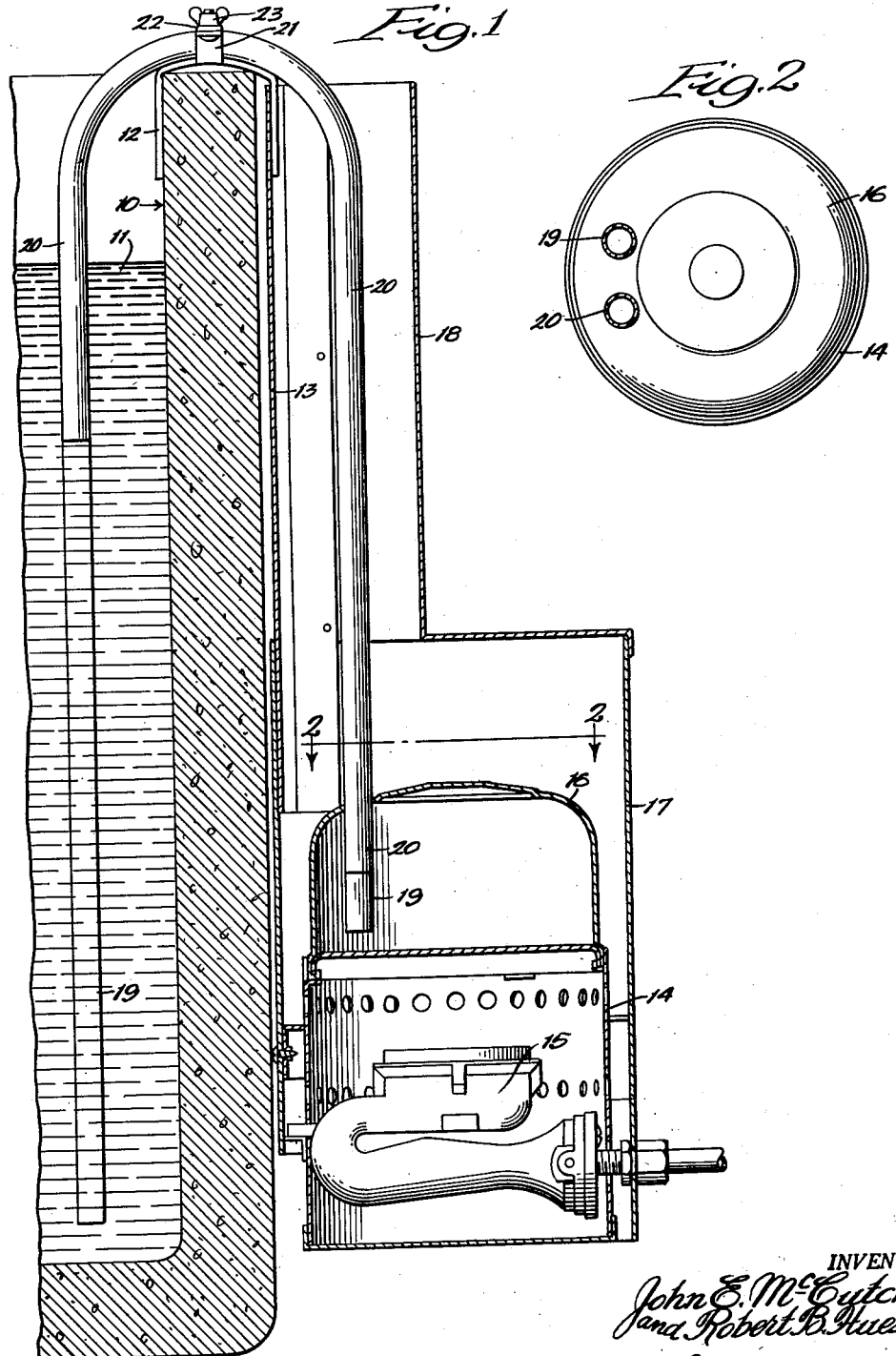

United States Patent Office 2,806,468
Patented Sept. 17, 1957

2,806,468

TANK HEATER

John E. McCutchen and Robert B. Hueston, Wichita, Kans., assignors to The Coleman Company, Inc., Wichita, Kans., a corporation of Kansas Application April 25, 1952, Serial No. 284,234

4 Claims. (Cl. 126—350)

This invention relates to a tank heater. The invention is particularly useful in heating a stock water tank and other similar tanks or vessels.

An object of the present invention is to provide a heater arrangement of a type whereby a tank such as a stock water tank may be heated effectively through long periods of time while requiring a minimum of attention from the user. A further object is to provide a heater for a liquid or water tank in which circulation operations take place that tend to keep the heating vessel clean and permit long and efficient operation of the heater. A still further object is to provide a heater adapted for use in heating tanks to supply an effective heat for maintaining the liquid or water at a desired temperature over a long period of time. Other specific objects and advantages will appear as the specification proceeds.

The invention is shown in an illustrative embodiment by the accompanying drawing, in which—

Figure 1 is a vertical sectional view showing the heater supported upon a tank for heating the water or other liquid therein; and Fig. 2, a plan and part sectional view taken at the line 2—2 as indicated in Fig. 1.

In the illustration given, 10 designates a tank having vertical side walls, which may be filled with water 11 or other liquid. For the purpose of illustration, the tank 10 is illustrated as a thick-walled stock tank which is substantially filled with water and which has an open top.

Over the top of the vertical wall of the tank 10 is secured a saddle support 12 which has welded or otherwise secured thereto a depending metal strap 13 for supporting the heater structure below. The heater structure comprises a casing 14 which provides a combustion chamber for the fluid fuel heater 15, and a second casing 16 providing a vessel for the heated water and steam, etc. The heater 15 may be fed with gas or any other suitable fluid fuel. About the heater members 14 and 16, we provide a casing 17 for conducting the exhaust gases upwardly, and a flue 18 maintains the exhaust gases about the upper portion of the pipes which will now be described.

We employ a long pipe 19, which extends from a point near the bottom of tank 10 upwardly over the wall of the tank and downwardly into the vessel 16 near the bottom thereof. We provide a short pipe 20, which is substantially parallel throughout with the long pipe 19 and which extends from an upper portion of the tank 10 over the wall of the tank and downwardly into the vessel 16, terminating, as indicated in Fig. 1, at a point above the lower portion of tank 10. The two U-shaped pipes are secured together upon the saddle 12 by upwardly-extending ears 21 secured to a cross strap 22 by wing nuts 23. Any suitable means may be employed for securing the pipes in the spaced relation shown and upon the saddle 12.

Operation

In the operation of the structure, the apparatus is installed by placing the saddle 12 upon the top of the vertical wall of the tank 10 with the inner ends of the pipe extending into the water 11, as indicated in Fig. 1. The heater is suspended by the strap 13 upon the other side of the tank wall.

The vessel 16 may be filled with water by any suitable means. We prefer to fill it by the following method: Vessel 16 is heated while empty for about one minute and then allowed to cool until the vacuum therein established draws water into vessel 16 through the pipes 19 and 20. It takes usually from one to two minutes, depending upon the outside temperature, to establish the siphon in the long tube 19, which siphon is maintained then throughout the operation of the heater. As the water in vessel 16 is heated, steam passes upwardly through the short pipe and purges air from the short pipe. There follows a period of circulation which is usually about an hour or so, with the steam or hot water passing from the short pipe 20 into the water in tank 10, while cold water siphons back into vessel 16 through long pipe 19. In an hour or so, an air lock forms in the short tube 20. When the air lock forms in the short tube 20, water is forced out through the long tube 19 until the water level within the vessel 16 is below the intake of the pipe 20 in vessel 16. When the water level thus falls below the intake of the short pipe 20, the pressure within the vessel 16 is relieved and slugs of water vapor force the air from the short pipe; thus breaking the air lock. Water then siphons back through the long tube 19 from tank 10 into vessel 16, cooling the vessel 16 and condensing the water vapors, causing water to rush back into vessel 16 through both pipes. The operation then is repeated, as above described.

By the above operation, which provides continuous recirculation, any sediment entering the vessel 16 is constantly stirred up by the recirculation steps and a portion thereof constantly removed, thus keeping the vessel 16 free from any stratification in the lower portion of the vessel.

The foregoing operation continues through days and weeks and practically no attention is required of the user or operator. It is merely necessary to replenish the gas supply or other fluid fuel supply from time to time and the water in tank 10.

While in the foregoing specification we have set forth a specific structure and specific steps of operation in considerable detail for the purpose of illustrating one embodiment of the invention, it will be understood that such details of structure or operation may be varied widely by those skilled in the art without departing from the spirit of our invention.

We claim:

1. In heater apparatus of the character described wherein a cyclic reversal of flow occurs automatically in the conduits thereof, the combination with a tank adapted to contain a liquid therein of a closed vessel positioned exteriorly and in the lower regions of said tank but spaced above the bottom thereof, means for heating said vessel, and a pair of parallel flow conduits extending upwardly from said vessel, turned laterally at an elevation above the upper level of such liquid in said tank and then turned downwardly to project into the liquid, one conduit terminating within the upper regions of said tank above said vessel and the other being longer and terminating adjacent the bottom of said tank below said vessel, the longer of the conduits terminating in the vessel below the corresponding end of the other.

2. In combination with a tank adapted to contain a liquid, apparatus for heating such liquid therein and being operative to effectuate automatically a periodic reversal of the liquid flow through the conduits thereof, said apparatus comprising a closed vessel adapted to be located at a position below the level of liquid in said tank and above the bottom of and exteriorly to said tank, means for heating said vessel, and a pair of substantially coextensive flow conduits extending upwardly from said vessel, turned laterally at an elevation above the liquid level in the tank and then turned downwardly to project into such liquid and terminate therein, one of said flow conduits being longer than the other and terminating in the vessel below the corresponding end of the other conduit, the longer conduit terminating in the tank at a position below and the other conduit terminating at a position above said vessel.

3. In heater apparatus of the character described wherein a periodic reversal of flow occurs automatically in the conduits thereof, the combination with a tank adapted to contain a liquid therein of a closed vessel disposed outside of the tank and located below the level of liquid in said tank and above the bottom of said tank but near the said bottom and being adapted to be heated, and a pair of flow conduits extending upwardly from said vessel, turned laterally at an elevation above the liquid level in the tank and then turned downwardly to project into the liquid, one of said flow conduits being longer than the other and terminating in both the vessel and tank below the corresponding ends of the other conduit, the longer of said conduits terminating in said tank below said vessel and the other above said vessel.

4. In apparatus adapted for use with a liquid-containing tank for heating the liquid therein and being operative to effectuate an automatic reversal at intervals of the liquid flow in the conduits thereof, a closed vessel adapted to be heated and to be positioned exteriorly of such tank at a location below the level of liquid in said tank and above the bottom of said tank, and a pair of flow conduits extending upwardly from said vessel, turned laterally at an elevation above the liquid level in such tank when the vessel is so positioned and then turned downwardly to project into the liquid in such tank and terminate below said liquid level, one of said flow conduits being longer than the other and terminating both interiorly and exteriorly of said vessel below the respective corresponding ends of the other, the exterior termination of the longer flow conduit being below said vessel and the exterior termination of the other flow conduit being substantially above said vessel.

References Cited in the file of this patent

UNITED STATES PATENTS

| | | |
|---|---|---|
| 314,773 | Antal | Mar. 31, 1885 |
| 373,754 | Rees | Nov. 22, 1887 |
| 392,431 | Higgins | Nov. 6, 1898 |
| 731,921 | Leach | June 23, 1903 |
| 1,210,585 | Behl | Jan. 2, 1917 |
| 1,849,266 | Bentz | Mar. 15, 1932 |
| 1,871,008 | Rentz | Aug. 9, 1932 |
| 2,143,755 | Archer | Jan. 10, 1939 |
| 2,540,546 | Putz | Feb. 6, 1951 |
| 2,594,616 | Blondeau | Apr. 29, 1952 |
| 2,631,807 | Witt | Mar. 17, 1953 |

FOREIGN PATENTS

| | | |
|---|---|---|
| 4,013 | Great Britain | of 1879 |
| 24,743 | Great Britain | of 1908 |
| 250,361 | Great Britain | Apr. 15, 1926 |
| 378,123 | Great Britain | Aug. 11, 1932 |
| 436,326 | France | Mar. 25, 1912 |
| 29,991 | Australia | Nov. 6, 1930 |